United States Patent
Dore et al.

(10) Patent No.: US 7,310,497 B2
(45) Date of Patent: Dec. 18, 2007

(54) RADIO COMMUNICATION REPEATER

(75) Inventors: Renaud Dore, Rennes (FR); Ludovic Jeanne, Rennes (FR); Francois Baron, Chatou (FR)

(73) Assignee: Thomson Licensing, Boulogne-Billancourt (FR)

( * ) Notice: Subject to any disclaimer, the term of this patent is extended or adjusted under 35 U.S.C. 154(b) by 162 days.

(21) Appl. No.: 10/520,611

(22) PCT Filed: Jun. 26, 2003

(86) PCT No.: PCT/EP03/50270

§ 371 (c)(1),
(2), (4) Date: Jan. 9, 2005

(87) PCT Pub. No.: WO2004/008658

PCT Pub. Date: Jan. 22, 2004

(65) Prior Publication Data

US 2005/0250442 A1 Nov. 10, 2005

(30) Foreign Application Priority Data

Jul. 10, 2002 (FR) .................................. 02 09094

(51) Int. Cl.
*H04B 7/185* (2006.01)

(52) U.S. Cl. ...................... 455/13.3; 455/11.1; 455/14; 455/15; 455/22; 455/230; 455/314; 370/279; 370/293; 370/315; 370/492; 370/501; 375/211; 375/316

(58) Field of Classification Search ................ 455/22, 455/7, 9, 15, 11.1, 12.1, 13.1, 13.3, 14, 13.4, 455/18, 130, 132, 230, 255, 257, 258, 259, 455/265, 313, 314, 315, 316, 20; 370/279, 370/293, 315, 318, 325, 492, 501; 375/211, 375/316

See application file for complete search history.

(56) References Cited

U.S. PATENT DOCUMENTS

| | | | | |
|---|---|---|---|---|
| 4,764,979 A | * | 8/1988 | Noguchi et al. | 455/22 |
| 5,924,022 A | * | 7/1999 | Beasley et al. | 455/218 |
| 5,930,293 A | * | 7/1999 | Light et al. | 375/211 |
| 6,484,012 B1 | * | 11/2002 | Nche et al. | 455/20 |
| 2003/0104781 A1 | * | 6/2003 | Son | 455/22 |

FOREIGN PATENT DOCUMENTS

| | | |
|---|---|---|
| EP | 0118997 | 9/1984 |
| EP | 0523687 | 1/1993 |
| EP | 0913959 | 5/1999 |

OTHER PUBLICATIONS

Search Report Dated Oct. 30, 2003.

* cited by examiner

*Primary Examiner*—Matthew Anderson
*Assistant Examiner*—Shaima Q. Aminzay
(74) *Attorney, Agent, or Firm*—Joseph J. Laks; Robert D. Shedd; Brian J. Cromarty

(57) ABSTRACT

The invention proposes a repeater designed for indoor transmissions. The useful frequency band is split into two frequency bands and the repeater amplifies the signals from one of the bands and translates them to the other band. The transposition of frequency bands results in preventing creating significant interference effects on the signal to be amplified. A management circuit is used to address, at lower cost, interference problems between the bands.

6 Claims, 1 Drawing Sheet

RADIO COMMUNICATION REPEATER

This application claims the benefit, under 35 U.S.C. § 365 of International Application PCT/EP03/50270, filed Jun. 26, 2003, which was published in accordance with PCT Article 21(2) on Jan. 22, 2004 in English and which claims the benefit of France patent application No. 0209094, filed Jul. 10, 2002.

FIELD OF THE INVENTION

The invention relates to a radio communication repeater and more specifically for indoor communication.

BACKGROUND OF THE INVENTION

Radio communication repeaters are used to amplify the signal to increase the range of a transmitter. The use of repeaters for broadcast signals is known. A receive antenna directed at a transmitter receives the signal which is amplified and then transmitted via another antenna the radiation of which does not cover the receive antenna. In some cases the broadcast signal comes from a satellite and is translated to another frequency band in order to be broadcast in a more restricted frequency band.

For indoor communications, the use of frequency bands situated at around 2.4 GHz and at around 5 GHz and intended for wireless domestic networks is known. However, these radio frequencies do not propagate easily, even not at all, through walls and ceilings. Such systems struggle to cover large houses which have several floors and a large number of internal walls.

One idea is to use one or more repeaters to overcome the propagation problems associated with the indoor environment and with the frequencies used. However, domestic networks are bidirectional networks which must make provision to repeat signals from various positions in multiple directions. Furthermore, these signals are strongly reflected by obstacles, creating interference with the transmitted signals.

Presently, there is no repeater designed for indoor transmissions and adapted to overcome echoes.

SUMMARY OF THE INVENTION

The invention proposes a repeater designed for indoor transmissions. To address the multi-directional aspect of antennas, the useful frequency band is split into two frequency bands and the repeater amplifies the signals from one of the bands and translates them to the other band. The transposition of frequency bands helps avoid creating significant interference effects on the signal to be amplified.

Thus, the invention is a radio communication repeater which includes a first path to receive signals in a first frequency band, to translate the received signals into a second frequency band and to transmit in the second frequency band, and a second path to receive signals in the second frequency band, to translate the received signals into the first frequency band and to transmit in the first frequency band.

According to a preferred embodiment, the repeater includes a management circuit to disable transmission from the first path if the second path receives signals first, and to disable transmission from the second path if the first path receives signals first. The management circuit disables the transmission means of the first and second paths when no signal is received by the first and second paths. The disabling of the transmission means of the first and second paths is carried out by cutting the power to amplifiers.

BRIEF DESCRIPTION OF THE DRAWINGS

The invention will be better understood, and other features and advantages will become apparent from reading the description that follows, with reference to the accompanying drawings in which.

DETAILED DESCRIPTION OF THE INVENTION

In the following description, the transmission band is assumed to lie between 5.15 and 5.825 GHz and is split into a first frequency band, for example between 5.15 and 5.35 GHz for Europe and the USA, and a second frequency band, for example between 5.5 and 5.7 GHz.

Figure 1:
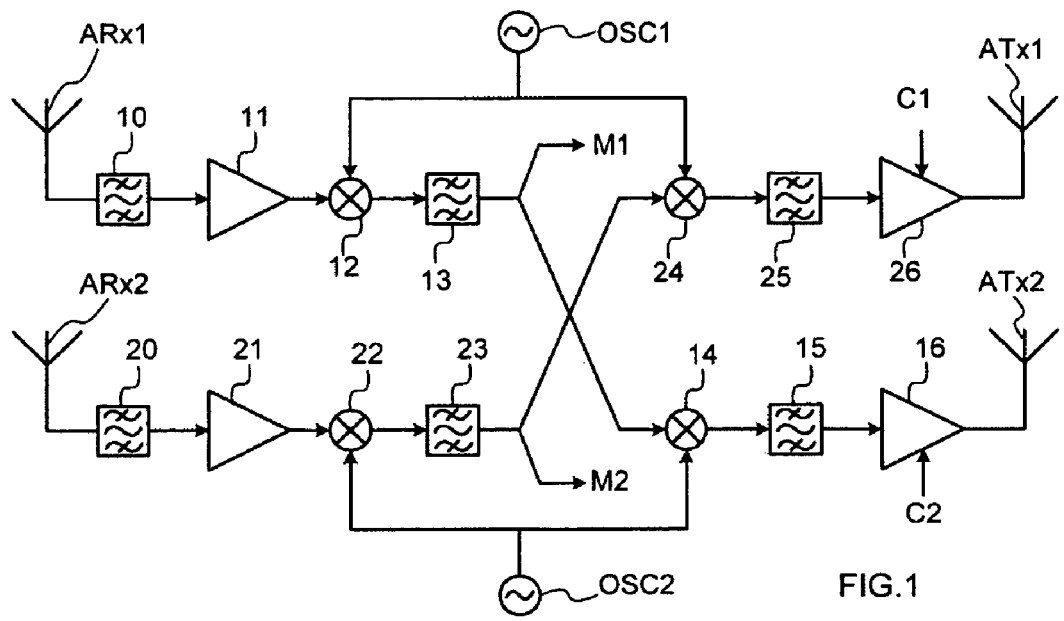
FIG. 1 represents the paths of the signals translated and amplified by the repeater according to the invention.

FIG. 1 represents a repeater with two signal paths. The first signal path includes a first receive antenna ARx1 connected to a first filter 10 to receive and convert signals located in the first frequency band to electrical signals, the first filter 10 being a bandpass filter with a passband corresponding to the first frequency band. A first amplifier 11 amplifies the signal from the first filter 10 and delivers it to a first mixer 12. The first mixer 12 mixes the signal from the first amplifier 11 with a signal, for example of frequency 4.15 GHz, from a first local oscillator OSC1. A second filter 13 selects, from the output of the first mixer 12, the translated signals corresponding to an intermediate band for example between 1 and 1.2 GHz, the second filter 13 being a bandpass filter with a passband corresponding to the intermediate frequency. A second mixer 14 mixes the signals from the second filter 13 with a signal, for example of frequency 4.5 GHz, from a second local oscillator OSC2. A third filter 15 selects, from the output of the second mixer 14, the signals corresponding to the second frequency band, the third filter 15 being a bandpass filter with a passband corresponding to the second frequency band. A second amplifier 16 amplifies the signals from the third filter 15 and delivers them to a first transmission antenna ATx2.

The second signal path includes a second receive antenna ARx2 connected to a fourth filter 20 to receive and convert signals located in the second frequency band to electrical signals, the fourth filter 20 being a bandpass filter with a passband corresponding to the second frequency band. A third amplifier 21 amplifies the signal from the fourth filter 20 and delivers it to a third mixer 22. The third mixer 22 mixes the signal from the third amplifier 21 with the signal from the second local oscillator OSC2. A fifth filter 23 selects from the output of the third mixer 22 the signals corresponding to the intermediate band, the fifth filter 23 being a bandpass filter with a passband corresponding to the intermediate band. A fourth mixer 24 mixes the signals from the fifth filter 23 with the signal from the first local oscillator OSC1. A sixth filter 25 selects from the output of the fourth mixer 24 the signals corresponding to the first frequency band, the fifth filter 25 being a bandpass filter with a passband corresponding to the first frequency band. A fourth amplifier 26 amplifies the signals from the sixth filter 25 and delivers them to a second transmission antenna ATx1.

Various embodiments of the signal paths are possible, the important aspect being that the first frequency band is translated to the second frequency band while amplifying the signals, and that the second frequency band is translated to the first frequency band while amplifying the signals.

Using an intermediate frequency band relaxes the constraints that would exist if a single translation were carried out to pass from the first frequency band to the second frequency band and vice versa. By using a single intermediate band for both paths, the same oscillators can be used for both paths, thus reducing costs.

Using two amplifiers per signal path means that lower cost amplifiers can be used and the amplification process can be distributed in order to reduce the noise factor at the receive end (amplifiers 11 and 21) while benefiting from sufficient transmit power (amplifiers 16 and 26). Nevertheless it is possible to use a single amplifier.

Moreover, although the example describes a system using four antennas, two for reception ARx1 and ARx2 and two for transmission ATx1 and ATx2, this number of antennas can be reduced to two, one transmitting and receiving in the first frequency band and the other transmitting and receiving in the second frequency band. It is even possible to use a single antenna, but this increases the filtering constraints on the first and fourth filters 10 and 20 for separating out the first and second frequency bands.

As represented in FIG. 1, there is a coupling between the antennas operating in the same frequency bands (a coupling that is very pronounced when the same antenna is used for both transmission and reception). One solution is to use an adaptive filter on each path, for example in place of filters 10 and 20, to suppress not only the signal amplified by the other path but also all the echoes resulting from the signals transmitted by the other path. Such a solution is relatively complex to implement.

In the context of an indoor transmission system operating according to the HiperLAN2 or IEEE 802.11a standard, a full-duplex type system is not necessary. Thus, as a preference, it is proposed to disable one signal path as soon as a signal is detected on the other signal path.

To this end, a management circuit retrieves the signals M1 from the output of the second filter 13 and the signals M2 from the output of the fifth filter 23. Based on signals M1 and M2, the management circuit generates control signals C1 and C2 which control the power supply to the fourth amplifier 26 and the second amplifier 16 respectively. As soon as a signal is detected on one of the paths, the amplifier of the other path is powered down.

To prevent unstable states, associated with the response time of the management circuit or the amplification of noise, the management circuit should preferably cut off the power supply to the second and fourth amplifiers 16 and 26 when no input signal is detected.

Figure 2:
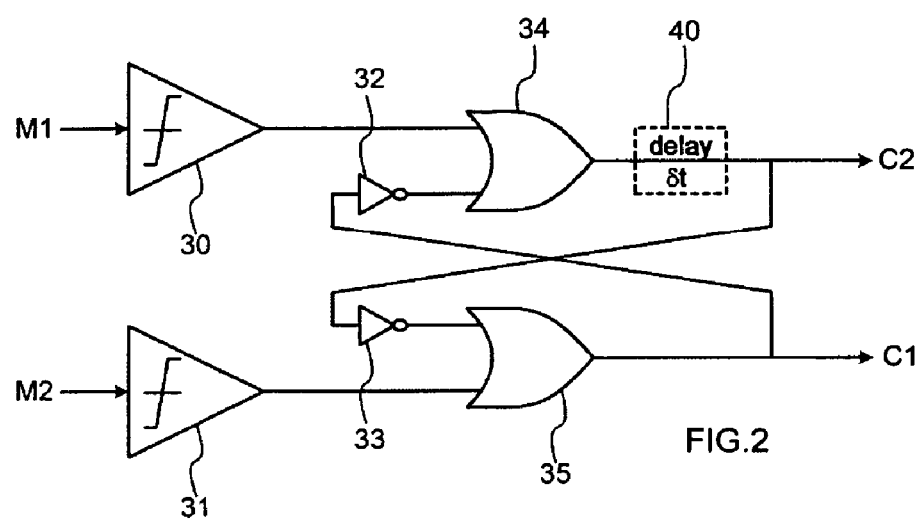
FIG. 2 represents a circuit for managing the paths of FIG. 1.

FIG. 2 shows an example embodiment of a management circuit according to the invention.

The management circuit includes a first and second thresholding means 30 and 31 receiving respectively signals M1 and M2 and outputting respectively binary signals M1' and M2' representing the state of signals M1 and M2 with respect to a threshold. Each thresholding means 30 or 31 is for example formed by a circuit measuring the average power of signals M1 or M2 in the intermediate band and by a Schmitt trigger which outputs a logic signal M1' or M2' representing the average power with respect to a predetermined threshold. The logic signal M1' (respectively M2') is at a logic level "0" when the signals M1 (respectively M2) are below the threshold and at a logic level "1" when the signals M1 (respectively M2) are above the threshold.

Logic gates 32 to 35 implement an asynchronous flip-flop reflected by the following truth table:

| line N° | M1' | M2' | C1(t) | C2(t) | C1(t + δt) | C2(t + δt) |
|---|---|---|---|---|---|---|
| 1 | 0 | 0 | X | X | 0 | 0 |
| 2 | 0 | 1 | 0 | X | 1 | 0 |
| 3 | 0 | 1 | X | 0 | 1 | 0 |
| 4 | 0 | 1 | 1 | 1 | 0 | 0 |
| 5 | 1 | 0 | 0 | X | 0 | 1 |
| 6 | 1 | 0 | X | 0 | 0 | 1 |
| 7 | 1 | 0 | 1 | 1 | 0 | 0 |
| 8 | 1 | 1 | 0 | 0 | 1 | 1 |
| 9 | 1 | 1 | 0 | 1 | 0 | 1 |
| 10 | 1 | 1 | 1 | 0 | 1 | 0 |
| 11 | 1 | 1 | 1 | 1 | 0 | 0 |

In this table, C1(t) and C2(t) correspond to the states of the control signals C1 and C2 respectively before a switching action of logic gates 32 to 35; C1(t+δt) and C2(t+δt) correspond to the states of control signals C1 and C2 respectively resulting from the switching of logic gates 32 to 35. Level "0" of a control signal C1 or C2 corresponds to cutting off the power to the amplifier 26 or 16 that the signal controls. Level "1" of a control signal C1 or C2 corresponds to powering up the amplifier 26 or 16 controlled by the said signal.

Line 1 corresponds to the case in which none of the paths receives. Lines 2, 3, 5 and 6 correspond to the case in which only one path receives signals. Lines 9 and 10 correspond to both paths receiving signals while an amplifier was already activated, which happens when the signal is amplified after it has been translated to the other band.

Lines 8 and 11 correspond to abnormal operation having a low probability of occurrence. Line 8 corresponds to unlikely cases in which both paths stimultaneously receive signals at the input from two different sources, resulting in the simultaneous activation of the amplifiers of both paths. Line 11 corresponds to a state following the state of line 8, which cuts off both amplifiers. The states of lines 8 and 11 then oscillate between each other as long as signals are received simultaneously by both paths.

Lines 4 and 7 correspond to states that can occur only if the previous state was that of line 8 and if one of the external sources stops transmitting. The next state then corresponds to the state of one of lines 2, 3, 5 or 6.

Assuming that the probability of attaining the state of line 8 is not negligible, it is preferable to suppress the abnormal operation. To avoid the scenario in which the state of line 8 starts to oscillate with the state of line 11, one of the gates 32 to 35 simply need be dimensioned such that it has a slower switching time than the other gates so as to pass either to the state of line 9 or to the state of line 10.

Another solution is to introduce at the output of a gate a delay circuit 40 the delay period δt of which is at least equal to the switching time of logic gates 32 to 35. If positioned as shown in FIG. 2, the delay circuit 40 introduces an additional line in the truth table:

| line N° | M1' | M2' | C1(t) | C2(t) | C1(t + δt) | C2(t + δt) |
|---|---|---|---|---|---|---|
| 8' | 1 | 1 | 0 | 0 | 1 | 0 |

Since line 8' occurs before line 8 and the delay δt is at least equal to the switching time of gates 32 to 35, the next state corresponds to that of line 10. Line 8 can no longer disturb the system, the states corresponding to lines 4, 7 and 11 no longer occurring.

The management circuit of FIG. 2 is given only as a guide and can be replaced by any other circuit that can provide management of both signal paths as indicated previously.

Other embodiments of the invention are possible. In particular, the first and second frequency bands can be much more restricted in size than indicated previously. The frequency band allocated in Europe includes a first band between 5.15 and 5.35 GHz and a second band between 5.47 and 5.725 GHz, corresponding to a 200 MHz band and a 255 MHz band that include, respectively, 9 and 11 channels of 20 MHz. The frequency band allocated to the USA includes a first band between 5.15 and 5.35 GHz and a second band between 5.725 and 5.825 GHz, corresponding to a 200 MHz band and a 100 MHz band that include, respectively, 9 and 4 channels of 20 MHz. For a domestic installation, a single channel is sufficient for the most part and the intermediate band can be reduced to a single channel. Channels are selected during the installation of the various devices according to the location in the premises. The repeater must be equipped with means for selecting the channel used as first frequency band and the channel used as second frequency band. The said selection means will then directly affect the frequencies of the local oscillators OSC1 and OSC2.

The invention claimed is:

1. Radio communication repeater wherein it includes: a first path to receive signals in a first frequency band, to translate the received signals into a second frequency band and to transmit in the second frequency band, a second path to receive signals in the second frequency band, to translate the received signals into the first frequency band and to transmit in the first frequency band; and a management circuit to disable transmission from the first path if the second path receives signals first, and to disable transmission from the second path if the first path receives signals first said first and second frequency bands being separated.

2. Repeater according to claim 1, wherein the management circuit includes thresholding means to compare the received signals with a receive threshold, the signals being considered received if they are above the said threshold.

3. Repeater according to claim 2 wherein the thresholding means compare the signals in the intermediate frequency band.

4. Repeater according to claim 1, wherein the first path includes a first translation means to translate the signals from the first frequency band to an intermediate frequency band and a second translation means to translate the signals from the intermediate frequency band to the second frequency band, in that the second path includes a first translation means to translate the signals from the second frequency band to the intermediate frequency band and a second translation means to translate the signals from the intermediate frequency band to the first frequency band, and in that the repeater includes a first local oscillator cooperating with the first translation means of the first path and the second translation means of the second path, and a second local oscillator cooperating with the second translation means of the first path and the first translation means of the second path.

5. Repeater according to claim 1, wherein the management circuit disables the transmission means of the first and second paths when no signal is received by the first and second paths.

6. Repeater according to claim 1, wherein the disabling of the transmission means of the first and second paths is carried out by cutting the power to amplifiers.

* * * * *